United States Patent [19]
Zens

[11] 3,791,671
[45] Feb. 12, 1974

[54] OCCUPANT RESTRAINT SYSTEM

[75] Inventor: John F. Zens, Algonac, Mich.

[73] Assignee: General Motors Corporation, Detroit, Mich.

[22] Filed: Nov. 10, 1972

[21] Appl. No.: 305,444

[52] U.S. Cl. .................. 280/150 AB, 137/525.1
[51] Int. Cl. .................................. B60r 21/08
[58] Field of Search ........... 280/150 AB; 137/525.1

[56] References Cited
UNITED STATES PATENTS

| | | | |
|---|---|---|---|
| 3,610,657 | 10/1971 | Cole | 280/150 AB |
| 3,642,303 | 2/1972 | Irish | 280/150 AB |
| 3,666,289 | 5/1972 | Magyar | 280/150 AB |
| 3,738,681 | 6/1973 | Wada | 280/150 AB |

Primary Examiner—David Schonberg
Assistant Examiner—John P. Silverstrim
Attorney, Agent, or Firm—Herbert Furman

[57] ABSTRACT

An occupant restraint system includes an inflator which supplies high temperature pressure fluid to a generally elongated hollow cylindrical diffuser. The diffuser includes two axially extending diametrically opposite flats and two radially spaced rows of slots, one row being in one flat and being divided into spaced groups, and the other row being between the flats. A torso cushion surrounds the diffuser and is fed from the other row of slots. A knee cushion fits within the torso cushion and has slits located transversely of respective groups of slots. A combined seal and heat shield member has an edge portion covering the one row of slots and has a flap portion covering the other row of slots. The member has slits indexed to the cushion slits. An elongated retainer plate within the knee cushion includes louvered openings equal in number to the groups of slots. Fixed studs extend through the knee cushion, seal, and diffuser and are threaded to tapped posts which extend through openings in the other flat of the diffuser. The edge portion of the member provides a seal between the knee cushion and the diffuser when the knee cushion is inflated to prevent flow of the pressure fluid from the knee cushion to the diffuser. The flap portion of the member is moved by the pressure fluid flowing through the other row of slots into the torso cushion into engagement with the knee cushion adjacent such other row of slots to protect the knee cushion from the high temperature pressure fluid.

3 Claims, 5 Drawing Figures

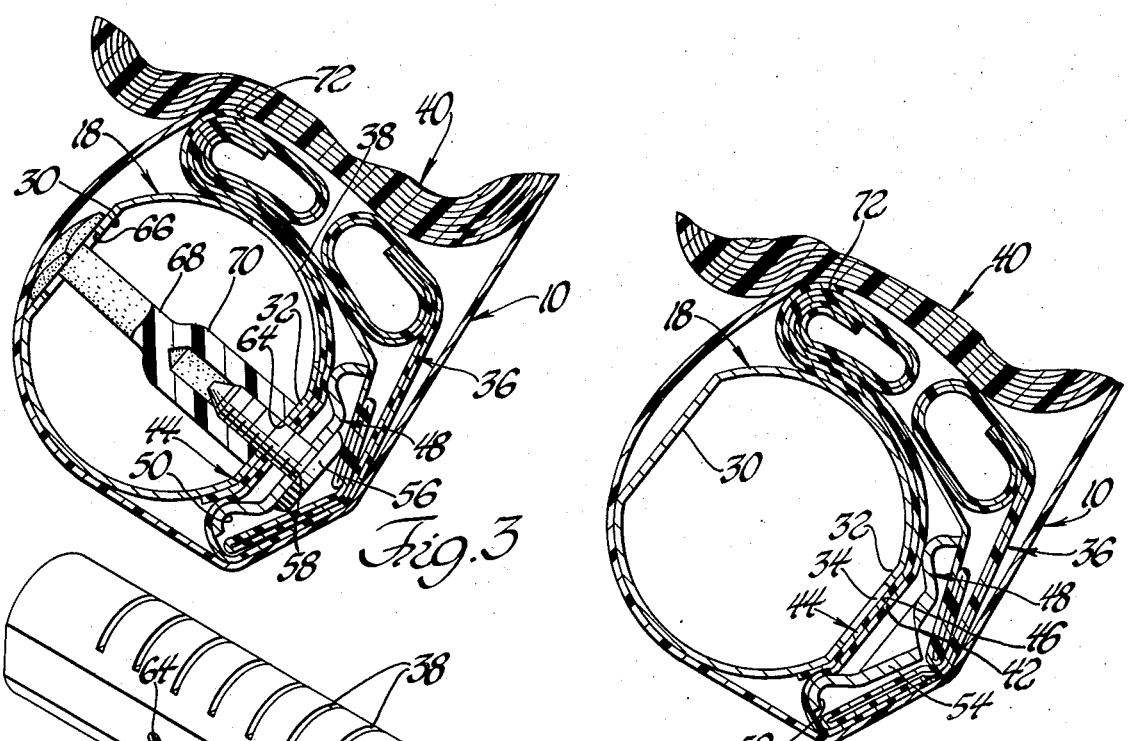
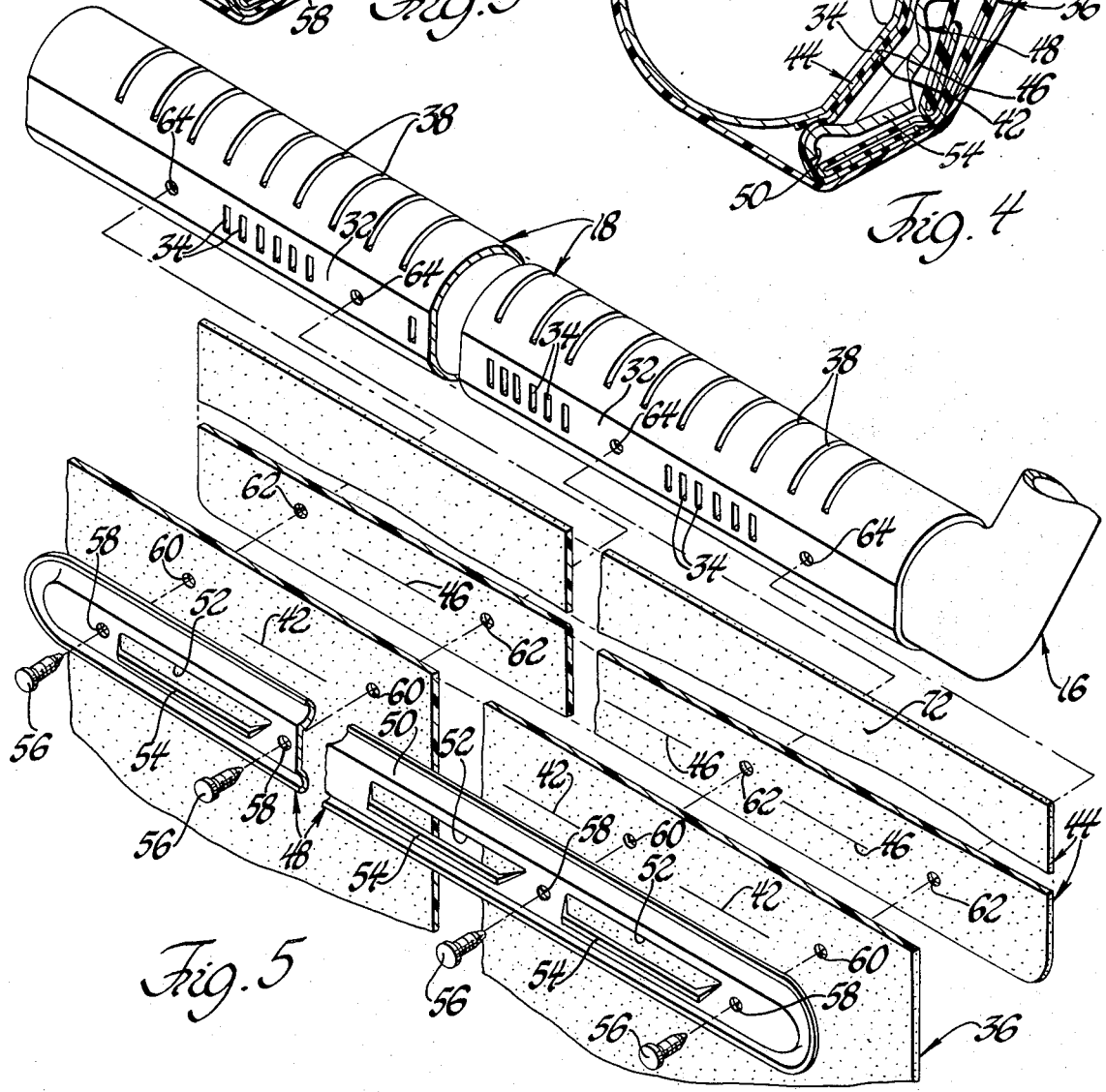

OCCUPANT RESTRAINT SYSTEM

This invention relates generally to occupant restraint systems and more particularly to a seal and heat shield means for an occupant knee cushion located within an occupant torso cushion.

Occupant restraint systems which include a knee cushion within a torso cushion are known. In such systems, the knee cushion is supplied with pressure fluid from the same diffuser as the torso cushion but through separate openings in the diffuser. It is also known to provide a seal between the knee cushion and the openings which supply pressure fluid to the knee cushion from the diffuser.

When the pressure fluid source is of the gas generator or augmented type, the pressure fluid entering the knee cushion and the torso cushion is at a relatively high temperature, such as 700° F. Since the knee cushion, when inflated, extends partially over the openings in the diffuser which supply the pressure fluid to the torso cushion, it is possible for the fabric or flexible material of the knee cushion to be subject to degradation from the high temperature pressure fluid flowing through the torso cushion openings. The seal and heat shield means of this invention protects the knee cushion against such degradation while also functioning to provide a seal between the knee cushion and the knee cushion openings.

In the preferred embodiment of the invention, the diffuser includes separate rows of slots, one row of slots supplying pressure fluid to the knee cushion and the other row supplying pressure fluid to the torso cushion. The rows of slots extend generally axially of the hollow cylindrical diffuser and are circumferentially spaced with respect to each other. A seal and heat shield member includes an edge portion which covers the knee cushion slots and is provided with slits which extend transversely of the slots and are aligned or indexed to like slits in the knee cushion. A retainer clamps the knee cushion and the edge portion of the member to the diffuser and is provided with louvered openings which direct the flow of pressure fluid from the aligned slits into the knee cushion. The member further includes a flap portion which covers the other row of slots when the cushions are in their normal stored position. When the pressure fluid is supplied to both rows of slots from the source, the flap portion is moved to one side of the torso cushion slots and into engagement with the adjacent portion of the knee cushion to protect this portion against degradation from the high temperature pressure fluid.

One feature of this invention is that it provides a combined seal and heat shield means for an occupant knee cushion located within an occupant torso cushion. Another feature of this invention is that the seal and heat shield means includes a member of high temperature resistant material having an edge portion thereof providing a seal between the knee cushion and the openings in a diffuser which supply pressure fluid to the knee cushion and further having a flap portion which covers the openings in the diffuser supplying pressure fluid to the torso cushion, with the flap portion being located in engagement with the knee cushion by the pressure fluid flowing through the torso cushion openings to protect such portion from the high temperature fluid.

These and other features of this invention will be readily apparent from the following specification and drawings wherein:

FIG. 3 is an enlarged sectional view taken generally along the plane indicated by line 3—3 of FIG. 2;

FIG. 4 is an enlarged sectional view taken generally along the plane indicated by line 4—4 of FIG. 1; and FIG. 5 is an exploded partially broken away view of a portion of FIG. 1.

Figure 1:
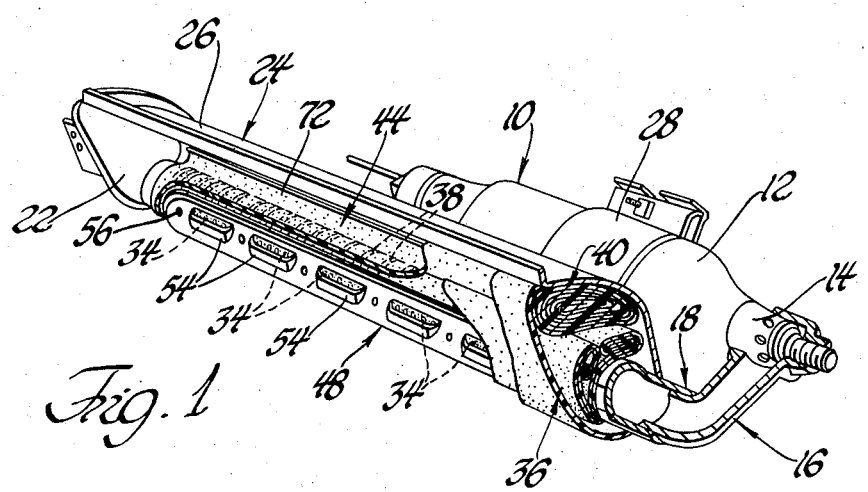
FIG. 1 is a partially broken away perspective view of an occupant restraint system according to this invention.
Figure 2:
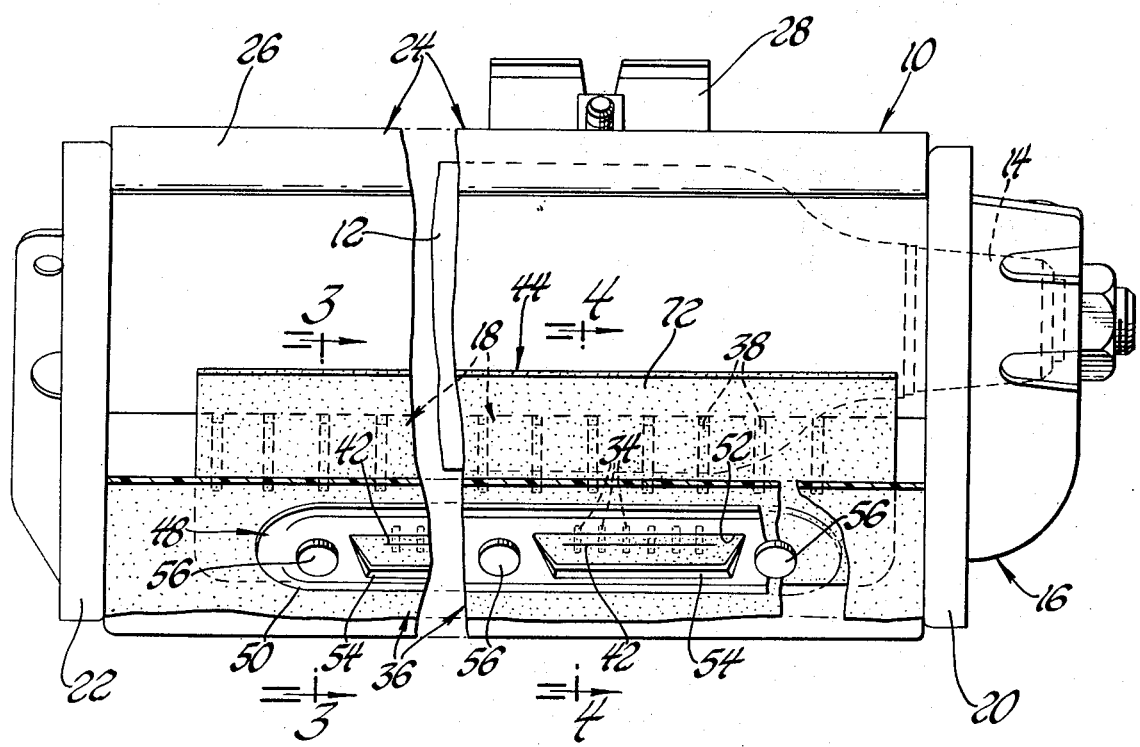
FIG. 2 is an enlarged broken away view of a portion of FIG. 1.

Referring now particularly to FIGS. 1 and 2 of the drawings, an occupant restraint system designated generally 10 according to this invention includes an inflator 12 of the augmented or gas generator type which provides a source of high temperature pressure fluid. The outlet 14 of the inflator communicates across a rupturable seal or diaphragm, not shown, with a manifold 16. The manifold 16 in turn is received within one open end of a generally cylindrical elongated diffuser 18. The diffuser 18 extends between the end plates 20 and 22 of a reaction plate assembly 24 and is indexed to plate 20. The manifold 16 is secured to plate 20 in a suitable manner. The other end of the diffuser is closed in a suitable manner and suitably secured to the end plate 22. A generally arcuate back plate 26 interconnects the plates 20 and 22 and mounts a bracket assembly 28 which provides for mounting of the inflator 12 to the reaction plate assembly. The reaction plate assembly is mounted to the vehicle within the instrument panel in a suitable manner. If desired, reference may be had to application Ser. No. 250,673, Henry J. Brockman and Lawrence A. Gloomis, filed May 5, 1972, for further details.

As best shown in FIGS. 3, 4 and 5, the diffuser 18 includes axially extending flats 30 and 32 which are located generally diametrically opposite of each other. The flat 32 includes five axially spaced groups 34, FIG. 1, of partially circumferentially extending slots. These slots supply the knee cushion 36 with pressure fluid from the diffuser as will be apparent from a further description. The diffuser 18 further includes a second row of axially spaced partially circumferentially extending slots 38, FIG. 1, which supply the torso cushion 40 with pressure fluid from the diffuser as will also be apparent from a further description. The cushions are separately supplied with pressure fluid since the knee cushion normally has no venting provisions while the torso cushion normally has such provisions to limit rebound of the occupant when the occupant engages the cushion. Cole U.S. Pat. No. 3,610,657 may be referred to for further details.

The knee cushion 36 as shown in FIG. 5 includes five spaced aligned slits 42 through the wall thereof, each slit being indexed in a predetermined transverse relationship to a respective group 34 of slots, as will be described. An elongated planar seal and heat shield member 44 includes five spaced slits 46 in an elongated edge portion thereof. Each slit 46 aligns with a respective slit 42.

An elongated bracket 48 includes a continuous peripheral arcuate rib 50. The portion of the bracket within the rib is provided with five openings 52, each of which is provided with an integral louver 54 formed from the material of the opening 52. Six threaded studs 56 have their shanks extending through openings 58 in the bracket, with the heads of the studs being welded to the bracket adjacent the openings. The studs extend through openings 60 in the knee cushion 36 and through openings 62 in the member 44 and through openings 64 in the flat 32 to index the bracket, knee cushion, and seal to the diffuser and in turn index the slits 42 to the openings 52 and the groups 34 of slots and also align a respective slit 46 to each slit 42. It will be noted that the openings 60, 62, and 64 are provided to each side of the respective slits 42 and 46 and respective groups 34 of slots.

As best shown in FIG. 3, the flat 30 is provided with an opening 66 in alignment with each opening 64 in the flat 32. When the bracket 48 has been fitted within the knee cushion and the member 44 assembled to the studs 56, the studs are then inserted through the openings 64 into the interior of the diffuser 18. Headed posts 68 are then fitted through each opening 66 and the tapped free ends 70 thereof are assembled to the studs 56 so that the rib 50 of the bracket tightly clamps the knee cushion and the slitted edge portion of member 44 to each other and to the diffuser 18 around the respective slits and groups of slots. This ensures that no pressure fluid will be lost between the diffuser and the edge portion of member 44 and likewise between the edge portion of member 44 and the knee cushion.

It will be noted with respect to FIG. 3 that the tapped ends 70 of the posts 68 seat on the inner surface of the flat 32. Thus, as the posts are threaded on the studs 56, the free ends 70 thereof will engage the flat 32 and maintain the diametrical relationship of this flat to the flat 30 without in any manner collapsing or deforming the diffuser 18.

It should also be noted that the openings 64 in the flat 32 are irregularly spaced and that the studs 56 are likewise irregularly spaced. This ensures that the louvered openings 52 will always be correctly positioned so as to deflect the flow of pressure fluid into the knee cushion from the slits 42 in the desired direction.

The torso cushion 40 is attached in a conventional manner to the diffuser 18 and when this cushion is in a stored position within the reaction plate assembly 24, it is located generally above the diffuser and within the confines of the arcuate back plate 26 between the end plates 20 and 22. The knee cushion 36 as shown in FIGS. 1, 3 and 4 is double-roll folded upon itself within the torso cushion 40 and located between the torso cushion and the diffuser.

With reference to FIGS. 1, 3 and 4, it will be noted that the member 44 includes a flap portion 72 which extends from the slitted edge portion around the diffuser 18 over the slots 38 and partially around the double-roll folded knee cushion 36. The member 44 is formed of any high temperature resistant flexible material, such as various silicone rubbers.

When the pressure fluid is supplied from the inflator 12 to the diffuser 18, it will flow through the groups 34 of slots, through respective aligned slits 42 and 46 and thence through the openings 52 into the knee cushion to initiate inflation and unrolling of the knee cushion, with the flow of pressure fluid through the openings 52 being directed by the louvers 54. The pressure fluid will also flow through the slots 38 and into the torso cushion to initiate inflation of this cushion with inflation of the knee cushion. As the pressure fluid flows through the slots 38, it will move the flap portion 72 of the member 44 to the right-hand side thereof, as viewed, in FIGS. 3 and 4, and locate this flap portion in engagement with the adjacent portion of the knee cushion to thereby protect this portion of the knee cushion from heat degradation due to the high temperature of the pressure fluid flowing through the slots 38. Thus, the member 44 acts both as a seal between the knee cushion and the slots 34 of the diffuser which supply pressure fluid to the knee cushion and further acts as a heat shield for the portion of the knee cushion adjacent the slots 38 when the knee cushion is being inflated and likewise the torso cushion is being inflated.

Thus, this invention provides an improved occupant restraint system.

I claim

1. An occupant restraint system comprising, in combination, a source of high temperature pressure fluid, a diffuser communicable with the source for receipt of pressure fluid therefrom and including first and second pressure fluid outlets, an occupant restraint torso cushion of flexible material communicating with the first pressure fluid outlet for inflation therefrom, an occupant restraint knee cushion of flexible material located within the torso cushion and communicable with the second pressure fluid outlet for inflation therefrom, a flexible heat resistant member having a first portion located between the knee cushion and the second pressure fluid outlet and provided with means cooperating with the pressure fluid outlet to provide a seal between the outlet and the knee cushion permitting the flow of pressure fluid only from the diffuser to the knee cushion, the member including a second flap portion extending over the first pressure fluid outlet, the pressure fluid flowing through the first pressure fluid outlet moving the second portion of the member to one side thereof and holding this portion in engagement with an adjacent portion of the knee cushion to protect this portion of the knee cushion from the high temperature pressure fluid flowing through the first outlet.

2. An occupant restraint system comprising, in combination, a source of high temperature pressure fluid, an elongated annular diffuser communicable with the source for receipt of pressure fluid therefrom and including first and second circumferentially spaced axially extending rows of pressure fluid outlets, an occupant restraint torso cushion of flexible material communicating with the first row of pressure fluid outlets for inflation therefrom, an occupant restraint knee cushion of flexible material located within the torso cushion and communicable with the second row of pressure fluid outlets for inflation therefrom, a flexible heat resistant member having an edge portion located between the knee cushion and the diffuser and covering the second row of pressure fluid outlets, means in the edge portion cooperating with the second row of pressure fluid outlets to provide a seal between the second row of pressure fluid outlets and the knee cushion permitting the flow of pressure fluid only from the diffuser to the knee cushion, the member including a flap portion extending from the edge portion over the first row of pressure fluid outlets, the pressure fluid flowing through the first row of pressure fluid outlets moving the flap portion of the member to one side thereof and into engagement with an adjacent portion of the knee cushion to protect this portion of the knee cushion from the high temperature pressure fluid flowing through the first row of pressure fluid outlets.

3. An occupant restraint system comprising, in combination, a source of high temperature pressure fluid, a diffuser communicable with the source for receipt of pressure fluid therefrom and including first and second pressure fluid outlets, an occupant restraint torso cushion of flexible material having means communicating with the first pressure fluid outlet for inflation therefrom, an occupant restraint knee cushion of flexible material located within the torso cushion and communicable with the second pressure fluid outlet for inflation therefrom, an elongated flexible heat resistant member having an edge portion located between the knee cushion and the second pressure fluid outlet and provided with means cooperating with the second pressure fluid outlet and the knee cushion means to permit the flow of pressure fluid only from the diffuser to the knee cushion, means clamping the edge portion of the member and the knee cushion to the diffuser around the second pressure fluid outlet, the member including a freely movable flap portion extending from the edge portion over the first pressure fluid outlet, the pressure fluid flowing through the first pressure fluid outlet moving the flap portion of the member to one side thereof and holding this portion against an adjacent portion of the knee cushion to protect this portion of the knee cushion from the high temperature pressure fluid flowing through the first outlet.

* * * * *